Sept. 9, 1969  W. B. FREID ET AL  3,465,950
SEPARATOR
Filed Jan. 22, 1968  2 Sheets-Sheet 1
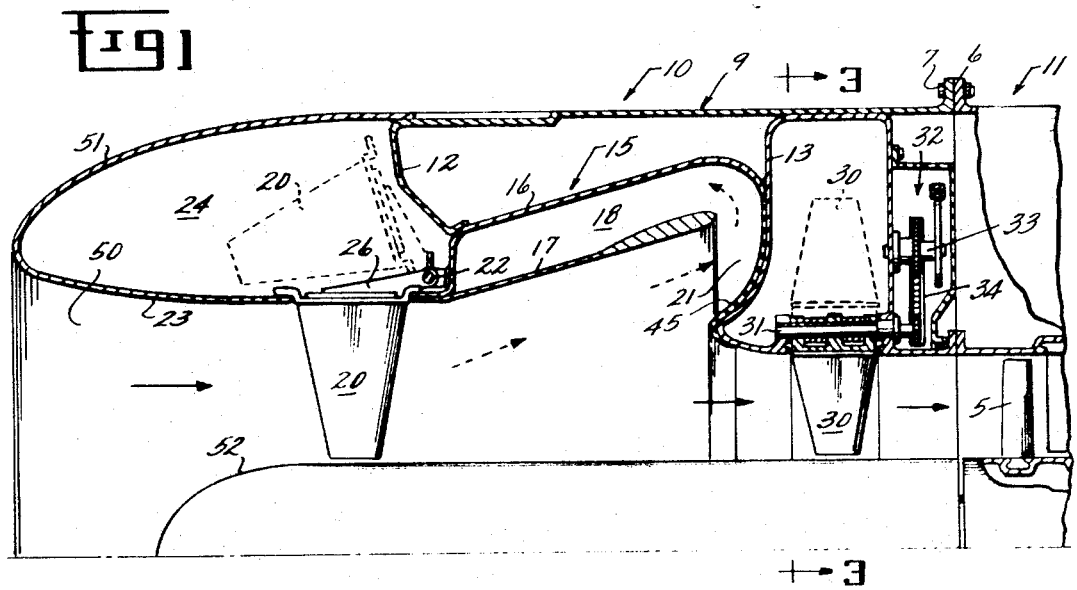
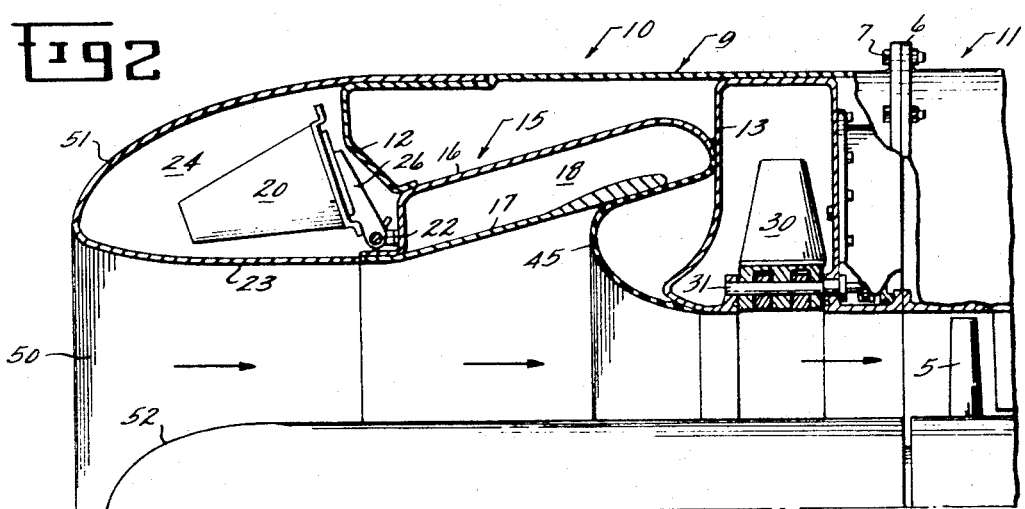
Inventors
WILBERT B. FREID
ROBERT J. DUFFY
DONALD F. SARGISSON
ATTORNEY

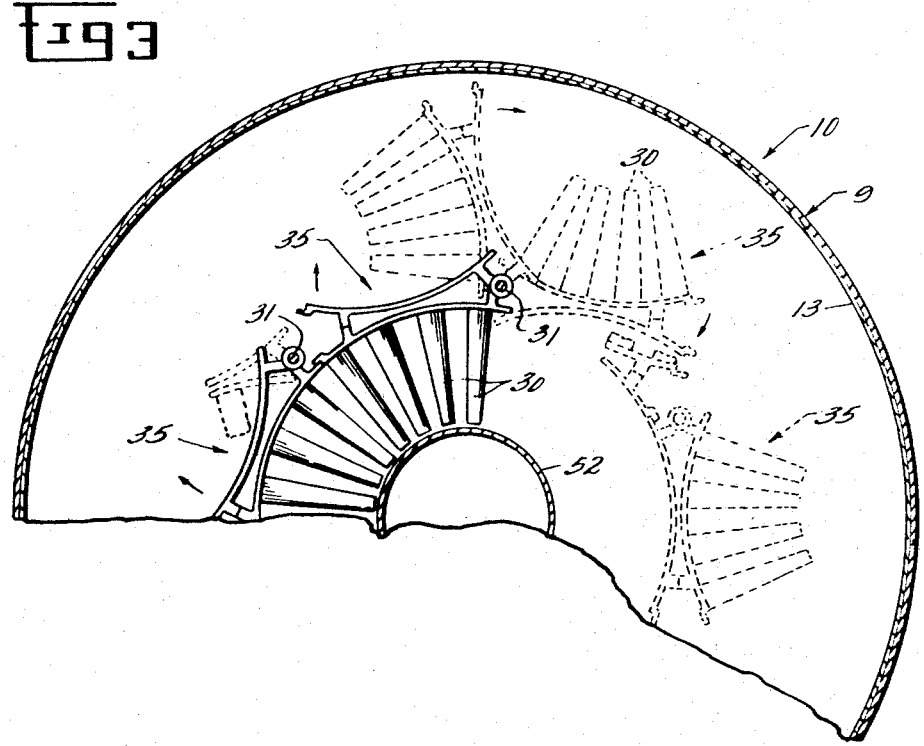

United States Patent Office 3,465,950
Patented Sept. 9, 1969

3,465,950
SEPARATOR
Wilbert Bernard Freid, Swampscott, Robert Joseph Duffy, Ipswich, and Donald Farley Sargisson, Marblehead, Mass., assignors to General Electric Company, a corporation of New York
Filed Jan. 22, 1968, Ser. No. 699,631
Int. Cl. F02c 7/04
U.S. Cl. 230—132                                    4 Claims

ABSTRACT OF THE DISCLOSURE

A separator with an axially extending passageway having means adjacent its inlet for imparting swirl motion to an incoming fluid stream. As a result of the swirl imparted to the fluid stream, particles of extraneous matter are forced into a collection chamber and thereafter means are provided downstream for removing the swirl. The swirl imparting members or vanes are located inside the leading edge of the bellmouth and are retractable when not being used. The deswirl members or vanes located downstream from the swirl members which are used to straighten the flow of air by removing the radial component prior to the air flow passing into a compressor means are also capable of being removed from the airstream thereby increasing engine efficiency.

BACKGROUND OF THE INVENTION

Field of the invention

This invention relates generally to an apparatus for imparting a radial component to an incoming airstream in order to remove any foreign particles from said airstream before damage may be caused to the compressor, and apparatus for straightening the airstream and removing the radial component of said airstream subsequent to passing the collection chamber and prior to entering the compressor, wherein the apparatus for imparting the radial component to the incoming airstream and the apparatus for straightening the airstream are both retractable from the airstream in order to increase engine efficiency when a separating function is not needed.

Description of prior art

Aircraft gas turbine engines are particularly susceptible to damage from foreign objects introduced into air inlets of the engines. This problem has been most acute in the past with respect to relatively large foreign objects such as stones, gravel, birds, hail and like which when introduced in the engine can cause instant damage. With the advent of gas turbine powered helicopters and other vertical take-off and landing aircraft, smaller particles of foreign matter such as sand, dust, and water have become increasingly troublesome, due primarily to the conditions under which such aircraft may be operated. Because of its vertical capability this type of aircraft may be utilized in areas where conventional airfields are non-existent, such as in combat zones and in isolated areas. Helicopters and other vertical landing aircraft are also specially suited for low altitude operation on both land and sea and have particular utility for certain low altitude missions including close combat support, search and rescue, and antisubmarine warfare. Under these and related conditions substantial quantities of small foreign objects such as sand, dust particles and droplets of water may become entrained in the airstream supplied to the gas turbine engine. These particles, which individually have little effect on the engine, can cause very substantial damage when introduced into the engine in large quantities. For example, it has been found that the engine of a helicopter operating at low altitude in a desert environment can lose performance rapidly due to erosion of engine blading by high velocity particles. In addition corrosive extraneous matter, particularly salt water, introduced into the engine can cause rapid and destructive corrosion.

The prior art has tried repeatedly in obtaining and designing new and unique separators which would be capable of removing all foreign objects imparted into the incoming airstream and at the same time being highly efficient during normal operating conditions.

In trying to prevent foreign objects from entering the airstream of a gas turbine engine, it has been customary to provide a grille or screen in the inlet passageway of the gas turbine engine. The provision of such a screen would prevent pebbles or other foreign objects from passing through the power plant during operation of the engine at or near ground level. However, the screen or grille placed at the inlet would drastically decrease the efficiency of the power plant because of the pressure drop which exists across said screen or grille. Experience has shown that the pressure drop across the screen or grille may exceed one pound per square inch, thereby adversely affecting the output of the power plant as much as seven percent.

In addition, if the power plant was intended for high altitude operation, experience has shown that there is considerable tendency for ice to form in the screen or grille. This icing condition may be of greater consequence than the mere reduction of output resulting from an increased pressure drop of the ice formation.

In order to minimize these problems, retractable protective shields or grilles were designed. Specifically, a shield or grille would be retracted from in front of the inlet passageway of the gas turbine engine at the discretion of the operator. However, with such a retractable protective device, it was necessary to provide means for disposing of the foreign objects which may have been previously lodged in the protective device in such a way that the particles are removed from the shield or screen without being capable of being ingested into the incoming airstream.

SUMMARY OF THE INVENTION

As a result of the deficiencies noted above, prior art separators have not been capable of effectively and efficiently removing small particles of sand, dust, water and the like from the airstream supplied to an aircraft gas turbine engine and still maintaining a high degree of engine efficiency. The present invention obviates many of the prior art deficiencies and is capable of efficiently removing foreign objects from the airstream supplied to the gas turbine engine.

The invention is particularly suited for use in aircraft installations where it is desired to remove foreign matter such as sand, dust, water from the airstream supplied to a gas turbine engine. With this particular application it has been possible to put into operation a separator only during conditions where possible ingestion of foreign particles into the incoming airstream is probable. During normal operations of flight, the separator and means utilized for causing separation are removed from the airstream thereby increasing the operating efficiency of the engine.

In the preferred embodiment disclosed herein, the invention relates to axial flow separators having improved means for more efficiently collecting and removing extraneous materials wherein said means do not reduce engine efficiency. Briefly stated, in carrying out the invention in one form, a separator having an axially extended passageway formed therein having retractable means adjacent its inlet for imparting swirl to a fluid stream. As a result of the swirl imparted to the fluid stream, particles of extraneous matter are forced radially outwardly thereby entering the collection means located downstream of the swirl producing means. Since it is desirable to remove all or a portion of the swirl from the airstream after the extraneous matter is removed, retractable deswirl means are provided downstream of the collection means.

In order to increase engine efficiency, the swirl producing and removing means are capable of being moved out of the airstream when not being utilized. Specifically, the swirl vanes, located just inside the leading edge of the bellmouth, are used to remove foreign particles from the fluid stream by imparting to said stream a radial component, thereby causing the foreign particles to move in an outwardly radial direction and into a collection means prior to causing any damage to the compressor which is located axially downstream from the compressor. Deswirl means are used to straighten the flow of the fluid stream and remove its radial component prior to entering the compressor. Since said swirl and deswirl means in an airstream decrease engine efficiency and since the said means are needed only when the chance of ingesting foreign particles is acute, the swirl and the deswirl means are capable of being placed into and retracted from the airstream. Thus, by removing said means from the airstream when not necessary, the overall efficiency of the engine is increased.

Accordingly, it is thus a primary object of this invention to provide an improved separator for efficiently removing extraneous matter from a fluid stream.

Another object of this invention is to provide a separator which is highly effective and removes matter from a fluid stream without causing excessive pressure losses in said fluid stream.

Still another object is to provide a lightweight compact separator for effectively removing small particles of sand, dust, water, and the like from the airstream supplied to an aircraft gas turbine engine and still maintaining high engine efficiency when said separator is not being used.

A further object is to provide protection to a gas turbine type of power plant against the entry of foreign objects and for minimizing the pressure drop in the inlet duct during periods when such protection is not required.

These and other objects, advantages, and features of the subject invention will hereinafter appear and, for purposes of illustration, but not of limitation, exemplary embodiment of the subject invention are shown in the appended drawing.

BRIEF DESCRIPTION OF THE DRAWING

FIG. 1 is a cross-sectional view of the inlet of a gas turbine engine depicting the separator in its operating condition.

FIG. 2 is a cross-sectional view of the inlet of a gas turbine engine showing the separator in its non-operative condition.

FIG. 3 is an axial view, taken along line 3—3 of FIG. 1.

DESCRIPTION OF THE PREFERRED EMBODIMENT

Referring first to FIG. 1, a portion of a gas turbine engine is illustrated, the engine having an outer cylindrical casing comprised of annular sections 9 and 11, secured together at the flanges 6 by circumferentially spaced bolts 7, as illustrated or by other suitable fastening means. Annular section 9 houses the inlet assembly of the gas turbine engine, basically referred to as 10. It is understood that the gas turbine engine can take the form of any turbojet, turboshaft or turboprop engine. The inlet assembly 10 includes in an axially spaced serial flow arrangement the inlet opening 50 comprising the passageway between the bellmouth 51 and the inner fairing 52, the retractable swirl vanes 20 in an operative condition, the axial flow separator 15, the retractable deswirl vanes 30 in an operative condition and the first stage rotor of the compressor generally indicated as 5.

As illustrated, the separator means, generally indicated as 15 is a static component with no moving parts. A row of retractable circumferentially spaced radially extending swirl vanes 20 is located adjacent the inlet opening 50, said retractable vanes having a desired turning configuration which will be described presently. Another row of retractable circumferentially spaced radially extending deswirl vanes 30 which communicate with the compressor inlet vanes 5 is located axially rearward of the separator 15. The retractable deswirl vanes 30 also have a required turning configuration which will be described below. Intermediate the swirl vanes 20 and deswirl vanes 30 is a separator and collection arrangement comprising a first wall member 16 and a second wall member 17, the first wall member 16 being substantially frusto-conical in shape, being supported at its upstream end by support member 12, and at its downstream end by support member 13, wherein both support members 12 and 13 are attached to the outer cylindrical housing 9. The second wall member 17 being substantially frusto-conical in shape, is coaxially located with respect to the first wall member 16 and supported at the upstream end by said first wall member 16. The second wall member 17 is of substantially smaller diameter than the first wall member 16, and as a result an annular extraction cavity 18 having a substantial radial extent is defined between said wall members. The cavity 18 has an annular inlet 21 at its downstream end, said inlet being defined as the area between the support member 13 and the downstream end of the wall member 17. The particles of extraneous matter which enter the cavity 18 in the manner described below are removed from said cavity by means of a trap door (not shown).

Located upstream of the separator 15 and downstream of the inlet opening 50 are circumferentially spaced radially extending swirl vanes 20 which are attached to an arm member 26 which is connected to a pivot point 22 so that swirl vanes 20 are capable of being pivoted forwardly and upwardly around the circumferentially spaced pivot point 22 by activating means (not shown). It being understood that the activating means may be solenoid operated, chain driven, or other suitable pivoting means well known in the art. In an operative condition (as shown in FIG. 1), wherein the swirl vanes are placed within the airstream, the arm members 26 of the swirl vanes 20 are supported by the first wall member 16 and the downstream edge of the inner wall member 23 which forms a portion of the bellmouth 51. In order that the swirl vanes may be stored within the cavity area 24 of the bellmouth 51 when they are in a retracted pivoted position, the bellmouth 51 is capable of being moved in an axial direction along support member 12 by any suitable means (not shown). FIG. 1 shows the bellmouth in its extended or opened position.

Located axially downstream of the separator 15 and upstream of the compressor inlet guide vanes 5 are circumferentially spaced radially extending deswirl vanes 30 which are capable of being pivoted around shaft 31 by pivoting means generally illustrated as 32. Specifically the pivoting means include a shaft 33 supported at one end by support member 13, having a chain drive assembly 34 communicating with a plurality of axial shafts 31. Thus by causing shaft 33 to rotate, the chain drive assembly rotates a plurality of axial shafts 31, wherein the deswirl vanes 30 attached thereto are caused to rotate in a tangential direction. Your attention is directed to FIG. 3 which represents an axial view taken along line 3—3 of FIG. 1, depicting a plurality of deswirl vanes 30 attached together by arcuate members 35 to form discrete vane sectors. As noted in FIG. 3 these sectors pivot around shaft 31 in a clockwise direction as represented by the arrows. The dotted sectors shown in FIG. 3 represent, in time sequence, the successive stages of rotation and the final retracted position of the discrete vane sectors. Although FIG. 3 only depicts one vane sector in its rotated position, it is to be understood that by means of the chain drive assembly 34, all of the vane sectors are caused to rotate at the same time, thereby being pivoted around their respective axial shaft 31 and thus removed from the air stream passage and placed into a retracted position leaving a smooth surface for passage of the air stream.

Attached to wall member 16 and support member 13 at the annular inlet 21, is an elastic diaphragm 45. While the construction and attachment of the elastic diaphragm may take different forms in practice, one suitable form is illustrated in U.S. Patent 3,338,049 issued to J. M. Fernberger on Aug. 20, 1967. It will undoubtedly occur to those skilled in the art that many other types of elastic diaphragms may be used in the arrangement described herein. By use of suitable inflating means (not shown), the elastic diaphragm 45 is capable of being inflated thereby completely blocking inlet opening 21 as illustrated in FIG. 2.

In an actual operation wherein a separating action is required, the swirl vanes 20 and deswirl vanes 30 are placed within the airstream, the bellmouth 51 being moved axially forward and the elastic diaphragm 45 being in a deflated position as indicated in FIG. 1. During the operation of the gas turbine engine, to which the inlet assembly 10 is attached, the low pressure area existing at the compressor inlet causes air to flow through the inlet opening 50 at high velocity as shown by the solid arrows in FIG. 1. As the air passes over the swirl vanes 20, it is turned circumferentially such that downstream of the vanes 20 the air stream has both tangential and axial velocity. This is known as imparting "swirl" to the fluid stream. Small particles of foreign matter which may be entrained in the air stream, also are turned, thus such a particle in the air stream will have both a tangential and axial velocity downstream of the swirl vanes 20. In theory, a particle leaving the swirl vanes 20 with both tangential and axial velocity and not being subject to any external forces will follow a straight line path to the outer periphery of the passageway at some point downstream of the vanes. In practice, however, the swirling air has a significant effect on the particles trajectory; its actual trajectory can be compared roughly to that of a helix having increasing diameter in the downstream direction.

In the preferred embodiment of the present invention, the swirl vanes 20 have a turning configuration which will cause the entrained extraneous matter to reach the outer periphery of wall member 17 and either flow directly into the inlet opening 21 and cavity 18 or strike wall member 16 and bounce therefrom through inlet 21 into cavity 18 as shown by the dotted arrows in FIG. 1. In order to increase the efficiency of the engine, the deswirl vanes 30 are inserted within the airstream in order to remove from said airstream the "swirl" previously imparted to said steam by swirl vanes 20. Deswirl vanes 30, having a turning configuration wherein downstream of the deswirl vanes 30, the airstream has only an axial velocity.

In a condition wherein separating action is not necessary, the swirl vanes 20 are removed from the airstream and stored within the cavity area 24 of the bellmouth 51 as indicated in FIG. 2. Upon storing the swirl vanes in their retracted condition, the bellmouth 51 supported by member 12 is caused to move in an axial forward and then rearward direction by any suitable activating means. At the same time, deswirl vanes 30 are removed from the airstream in the manned described hereinabove, and the elastic diaphragm member 45 is inflated. By reason of the fact that the swirl vanes 20, and the deswirl vanes 30 which previously imparted turbulence within the airstream, have been removed the incoming airstream now has a smooth passage flow from inlet opening 50 to the inlet guide vanes of the compressor 5, as indicated by the arrows in FIG. 2.

From the foregoing, it will be seen that the improved axial flow separator of this invention is highly efficient in removing small particles of extraneous matter from a fluid stream without causing excessive pressure losses in the fluid stream and without excessively reducing air flow when used in a gas turbine engine assembly. In addition to being highly effective, the separator of this invention is lightweight and compart and is therefore particularly suitable for aircraft applications.

While preferred embodiments of the invention have been illustrated and described above, it will be understood that various changes and modifications may be made without departing from the spirit and scope of the invention, and it is intended to cover all such changes and modifications by the appended claims.

What is claimed as new and desired to be secured by Letters Patent of the United States is:

1. A separator apparatus in an inlet of a gas turbine engine for removing extraneous particles from the fluid stream, comprising:
   an axially extending fluid passageway having at its opposite ends thereof an inlet, and an outlet communicating with compressor means,
   a retractable swirl producing means adjacent said inlet for imparting swirl to a fluid stream and having a first position within said fluid passageway and a second position removed from said fluid passageway,
   a separator means spaced axially downstream of said swirl producing means for receiving extraneous particles, and
   a retractable deswirl producing means for removing swirl previously imparted to a fluid stream, said deswirl producing means being located adjacent said outlet and having a first position placed within said fluid passageway and a second position removed from said fluid passageway.

2. Apparatus as defined by claim 1 wherein the means for retracting the deswirl producing means from the fluid stream includes a plurality of circumferentially spaced pivot members placed in a parallel position to the fluid stream and attached to a plurality of deswirl producing means, actuator means comprising a chain drive assembly wherein all the pivot members are caused to rotate at substantially the same time thereby removing the deswirl producing means from the fluid stream.

3. Apparatus as defined by claim 1 in which the swirl producing means in the second position are stored within cavity means communicating with axially extending passageway.

4. Apparatus as defined in claim 1 wherein said separator means has a storage means for receiving extraneous particles, and said apparatus further includes flexible diaphragm means for selectively closing the inlet to said storage means.

References Cited

UNITED STATES PATENTS

| | | | |
|---|---|---|---|
| 2,381,705 | 8/1945 | Vokes. | |
| 3,309,867 | 3/1967 | Ehrich. | |
| 3,242,671 | 3/1966 | Moorehead | 55—306 |
| 3,338,049 | 8/1967 | Fernberger. | |
| 3,362,155 | 1/1968 | Driscoll. | |

HENRY F. RADUAZO, Primary Examiner

U.S. Cl. X.R.

55—306; 60—39.09